(12) United States Patent
Siuvatti (10) Patent No.: US 11,067,246 B2
(45) Date of Patent: Jul. 20, 2021

(54) OPTICAL DEVICE FOR MODIFYING LIGHT DISTRIBUTION

(71) Applicant: LEDIL OY, Salo (FI)

(72) Inventor: Arsi Siuvatti, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 16/770,817

(22) PCT Filed: Nov. 1, 2018

(86) PCT No.: PCT/FI2018/050795
§ 371 (c)(1),
(2) Date: Jun. 8, 2020

(87) PCT Pub. No.: WO2019/135021
PCT Pub. Date: Jul. 11, 2019

(65) Prior Publication Data
US 2021/0180767 A1    Jun. 17, 2021

(30) Foreign Application Priority Data

Jan. 4, 2018   (FI) .................................. 20185007

(51) Int. Cl.
*F21V 5/04*      (2006.01)
*F21V 7/00*      (2006.01)
(Continued)

(52) U.S. Cl.
CPC .............. *F21V 5/04* (2013.01); *F21V 7/0091* (2013.01); *G02B 19/0028* (2013.01); *F21W 2131/103* (2013.01)

(58) Field of Classification Search
CPC . F21V 5/04; F21V 7/0091; F21V 5/00; F21V 5/02; F21V 5/43; F21V 5/45; G02B 19/0028; G02B 19/0004; F21W 2131/103
See application file for complete search history.

(56) References Cited

U.S. PATENT DOCUMENTS

| | | | |
|---|---|---|---|
| 8,628,222 B2* | 1/2014 | Kelley | F21V 5/045 |
| | | | 362/335 |
| 9,732,936 B2* | 8/2017 | Chen | F21V 5/04 |

(Continued)

FOREIGN PATENT DOCUMENTS

| | | |
|---|---|---|
| AU | 2013 204 682 | 5/2013 |
| EP | 2 776 883 | 9/2014 |

(Continued)

OTHER PUBLICATIONS

International Search Report, PCT/FI2018/050795, dated Feb. 4, 2019.
Written Opinion, PCT/FI2018/050795, dated Feb. 4, 2019.

*Primary Examiner* — Bao Q Truong
(74) *Attorney, Agent, or Firm* — Nixon & Vanderhye (57) ABSTRACT

An optical device for modifying a light distribution pattern of a light source is presented. The light source radiates first light beams to a first geometric quarter-space and second light beams to a second geometric quarter-space, where the first and second quarter-spaces are defined by mutually perpendicular geometric planes one of which constitutes a boundary between the first and second geometric quarter-spaces. The optical device includes a lens-section for modifying a light distribution pattern of the first light beams and two reflector surfaces for reflecting the second light beams from the second geometric quarter-space to the first geometric quarter-space. The two reflector surfaces are successively in a direction perpendicular to the boundary between the first and second geometric quarter-spaces and make it possible that the optical device can be lower than in a case where only one reflector surface is used.

20 Claims, 8 Drawing Sheets

(51) Int. Cl.
*G02B 19/00* (2006.01)
*F21W 131/103* (2006.01)

(56) References Cited

U.S. PATENT DOCUMENTS

| | | | |
|---|---|---|---|
| 2012/0287649 A1* | 11/2012 | Kelley | G02B 19/0028 |
| | | | 362/335 |
| 2012/0300488 A1 | 11/2012 | Broughton | |
| 2014/0078748 A1 | 3/2014 | Kelley | |
| 2014/0192521 A1* | 7/2014 | Laakkio | G02B 6/0045 |
| | | | 362/145 |
| 2015/0192267 A1 | 7/2015 | Goldstein et al. | |
| 2015/0204512 A1 | 7/2015 | Chen et al. | |

FOREIGN PATENT DOCUMENTS

| | | |
|---|---|---|
| EP | 3 032 311 | 6/2016 |
| WO | WO 2014-044926 | 3/2014 |

* cited by examiner

OPTICAL DEVICE FOR MODIFYING LIGHT DISTRIBUTION

FIELD OF THE DISCLOSURE

The disclosure relates generally to illuminating engineering. More particularly, the disclosure relates to an optical device for modifying a light distribution pattern of a light source that can be, for example but not necessarily, a light emitting diode "LED".

BACKGROUND

Figure 1A:
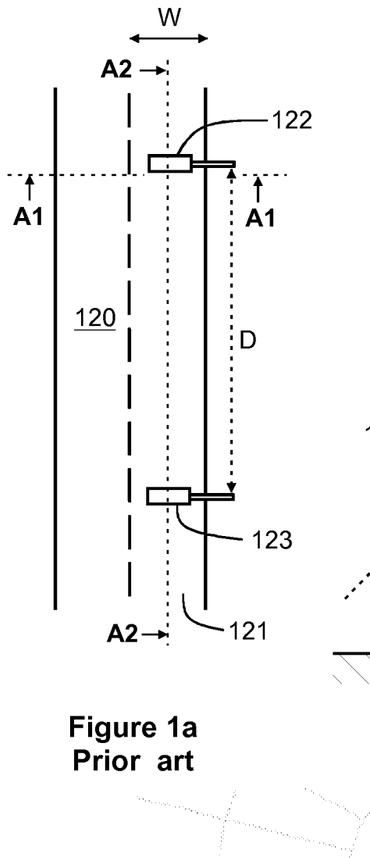
FIGS. 1a-1c show a schematic illustration of a street lighting application according to the prior art.
Figure 1B:
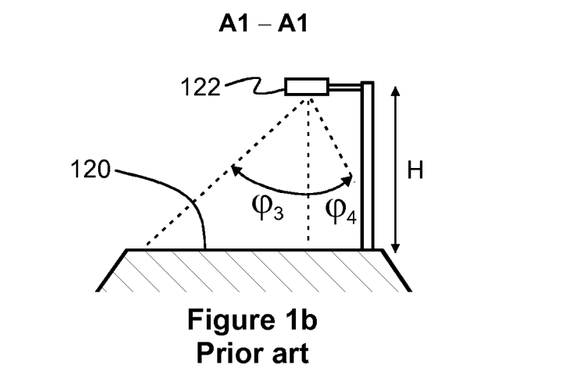
Figure 1C:
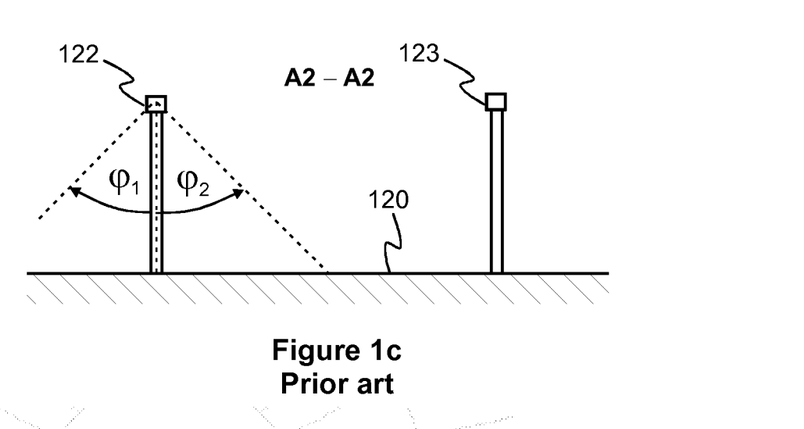

Distribution of light produced by a light source can be important or even critical in some applications. The light source can be, for example but not necessarily, a light emitting diode "LED", a filament lamp, or a gas-discharge lamp. FIG. 1a shows a schematic illustration of a street lighting application where streetlamps 122 and 123 are arranged to illuminate a road 120. FIG. 1b shows a view of a section taken along the line A1-A1 shown in FIG. 1a, and FIG. 1c shows a view of a section taken along the line A2-A2 shown in FIG. 1a. Each of the streetlamps 122 and 123 may comprise, for example, a lighting fixture that comprises a plurality of light sources, e.g. light emitting diodes "LED", and optical devices each of which being arranged to modify the light distribution pattern of one or more of the light sources. An exemplifying optical device 101 according to the prior art is illustrated in FIGS. 1e and 1f where FIG. 1f shows a view of a section taken along the line A—A shown in FIG. 1e. A light source 102 is arranged to radiate first light beams to a first geometric quarter-space 103 and second light beams to a second geometric quarter-space 104, where the first and second geometric quarter-spaces are defined by mutually perpendicular geometric planes 105 and 106 so that the geometric plane 105 constitutes a boundary between the first and second geometric quarter-spaces 103 and 104. In FIGS. 1e and 1f, some of the first light beams are depicted with dot-and-dash line arrows and some of the second light beams are depicted with dashed line arrows. It is to be noted that the above-mentioned geometric planes 105 and 106 are mere geometric concepts for illustrative purposes only but not physical elements of the optical device 101 or of the light source 102. The geometric plane 105 is parallel with the yz-plane of a coordinate system 199 and the geometric plane 106 is parallel with the xy-plane of the coordinate system 199. The optical device 101 comprises a lens-section 107 for modifying a light distribution pattern of the first light beams. The optical device 101 comprises a reflector surface 108 for reflecting at least a part of the second light beams to the first quarter-space 103 as illustrated in FIGS. 1e and 1f. The reflector surface 108 is a surface of a cavity 109. The geometric forms of the cavity 109 and the refractive index of the transparent material of the optical device 101 are selected so that the total internal reflection "TIR" takes place on the reflector surface 108.

Figure 1D:
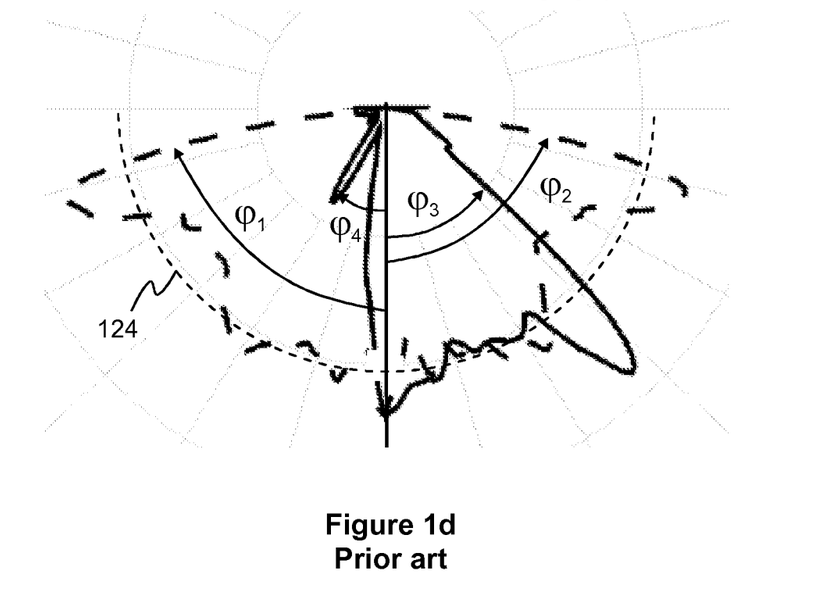
FIG. 1d shows polar plots illustrating simulated luminance distributions on the surface of a road shown in FIGS. 1a-1c when optical devices according to the prior art are being used.
Figure 1E:
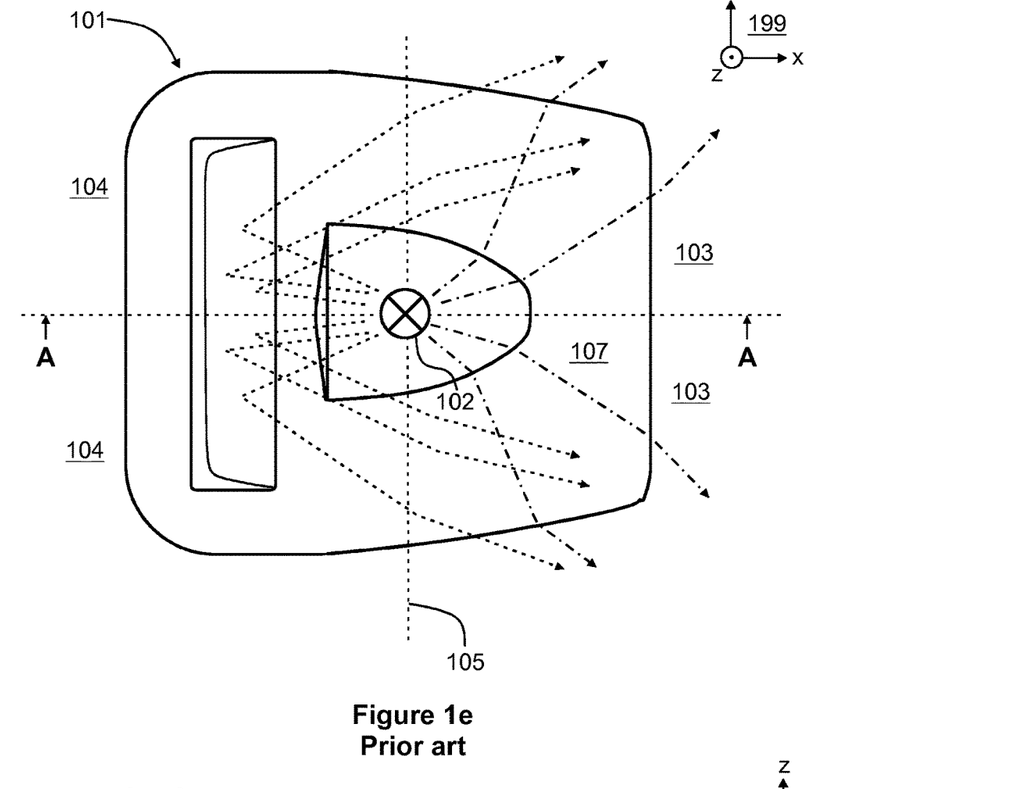
FIGS. 1e and 1f illustrate an optical device according to the prior art.
Figure 1F:
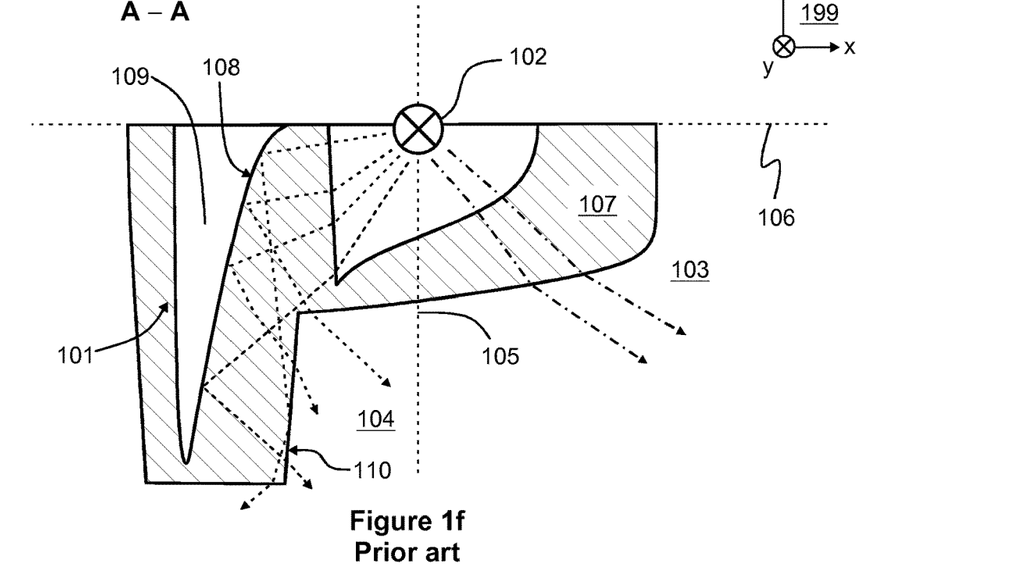

FIG. 1d shows polar plots illustrating simulated luminance distributions on the surface of the road 120 when optical devices of the kind described above are being used in an exemplifying situation where the distance D between the adjacent streetlamps is about 4.5 times the height H of streetlamp poles and the width W of a lane 121 is about a half of the height H of the streetlamp poles. The solid line polar plot shows the luminance distribution on the line A1-A1 shown in FIG. 1a and the dashed line polar plot shows the luminance distribution on the line A2-A2 that is on the middle of the lane 121. Angles $\varphi_1$ and $\varphi_2$ are defined in FIG. 1c and angles $\varphi_3$ and $\varphi_4$ are defined in FIG. 1b. An ideal situation would be such that the luminance is at a suitable level and uniform on the surface of the road. In FIG. 1d, a circle arc 124 illustrates a situation where the luminance is uniformly distributed.

As shown by the solid line polar plot in FIG. 1d, a part of the light is not directed to the road 120 but backwards from the streetlamps. As illustrated in FIG. 1f, the backwards directed light is at least partly caused by undesired reflections on a surface 110 that is near vertical. The near-vertical surface 110 is needed for enabling the reflector surface 108 to be so high in the z-direction of the coordinate system 199 that substantially all light radiated to the second geometric quarter-space 104 falls on the reflector surface 108. In principle, the lens-section 107 could be thicker in the z-direction of the coordinate system 199 so as to avoid the near-vertical surface 110 but a thicker lens-section would increase the attenuation caused by the optical device. Thus, a geometry which provides a reflector surface that is high enough is not free from challenges.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces. An optical device according to the invention comprises:

- a lens-section for acting as a lens for modifying a light distribution pattern of the first light beams,
- a first reflector surface for reflecting a first part of the second light beams from the second geometric quarter-space to the first geometric quarter-space, and
- a second reflector surface for reflecting a second part of the second light beams from the second geometric quarter-space to the first geometric quarter-space.

The above-mentioned first and second reflector surfaces are successively in a direction perpendicular to the first geometric plane so that the first reflector surface is between the first geometric plane and the second reflector surface. The first reflector surface is farther from the second geometric plane than is the second reflector surface so that an area between the first reflector surface and the second geometric plane constitutes a propagation passage for the second part of the second light beams on a route to the second reflector surface.

The above-mentioned optical device is a transparent piece that comprises:
- a first cavity for the light source,
- a second cavity whose surface constitutes the first reflector surface so that total internal reflection takes place when the first part of the second light beams arrive, from inside the transparent piece, at the surface of the second cavity, and
- a third cavity whose surface constitutes the second reflector surface so that total internal reflection takes place when the second part of the second light beams arrive, from inside the transparent piece, at the surface of the third cavity, a wall between the first and second cavities being farther from the second geometric plane than is a wall between the second and third cavities, and a part of the wall between the second and third cavities constitutes a part of the route of the second part of the second light beams to the second reflector surface.

The above-described optical device that comprises the above-mentioned first and second reflector surfaces does not need to be as high as a corresponding optical device that comprises only one reflector surface because the first reflector surface, which is nearer to the light source, reflects light for which the second reflector surface would be too low.

In accordance with the invention, there is provided also a new lighting fixture comprising at least one light source and at least one optical device according to the invention. The at least one light source may comprise, for example, one or more light emitting diodes "LED".

In accordance with the invention, there is provided also a new system comprising a road and at least one streetlamp comprising at least one lighting fixture according to the invention, wherein each optical device of the least one lighting fixture is positioned with respect to the road so that a geometric section line between the above-mentioned first and second geometric planes related to the optical device under consideration is substantially parallel with the longitudinal direction of the road.

A transparent piece constituting an optical device according to the invention can be manufactured for example by mold casting.

In accordance with the invention, there is provided also a new mold having a form suitable for manufacturing, by mold casting, the above-mentioned single piece of transparent material.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which:

FIGS. 1a-1f have already been explained in the Background-section of this document.

DESCRIPTION OF EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2A:
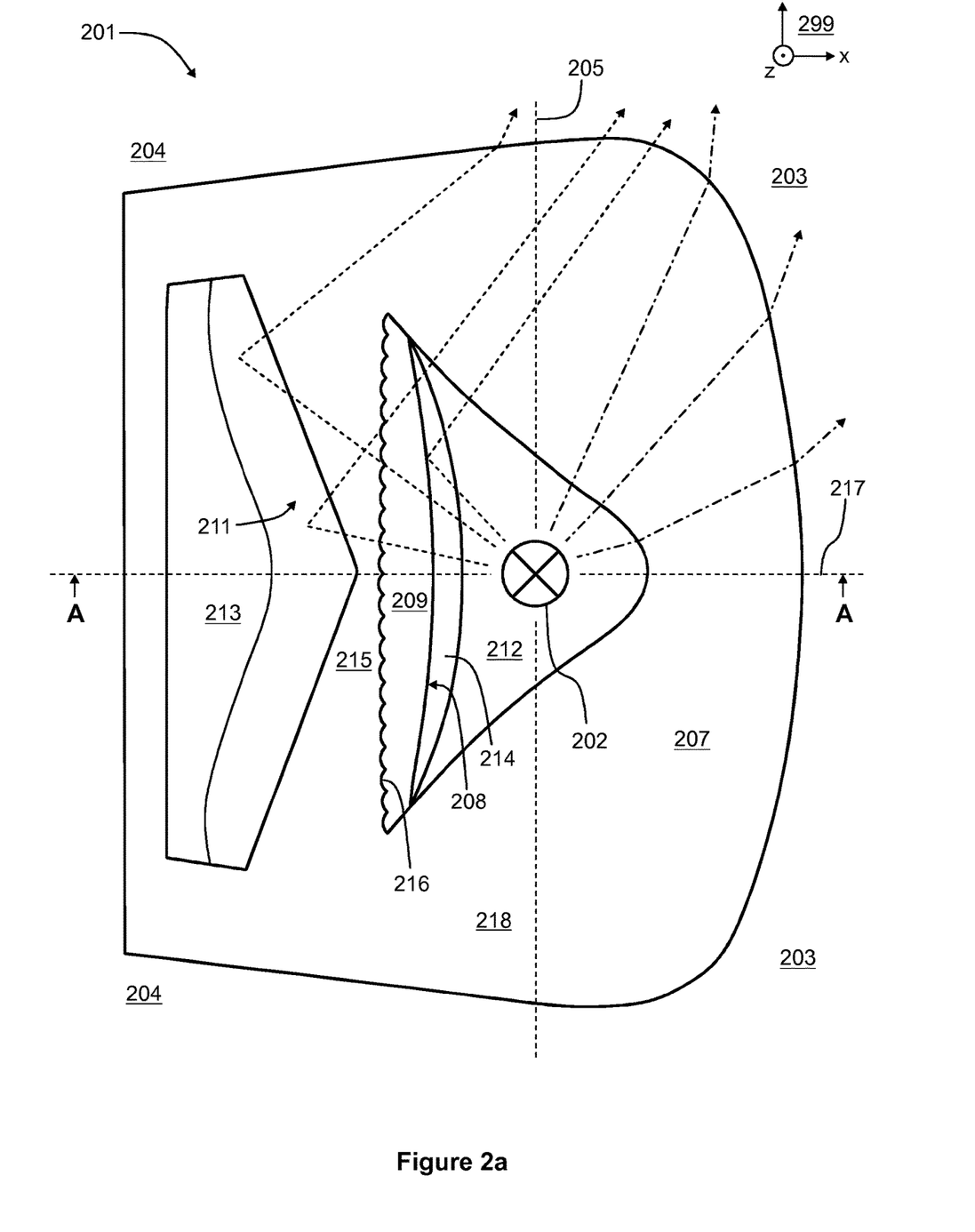
FIGS. 2a and 2b illustrate an optical device according to an exemplifying and non-limiting embodiment of the invention.
Figure 2B:
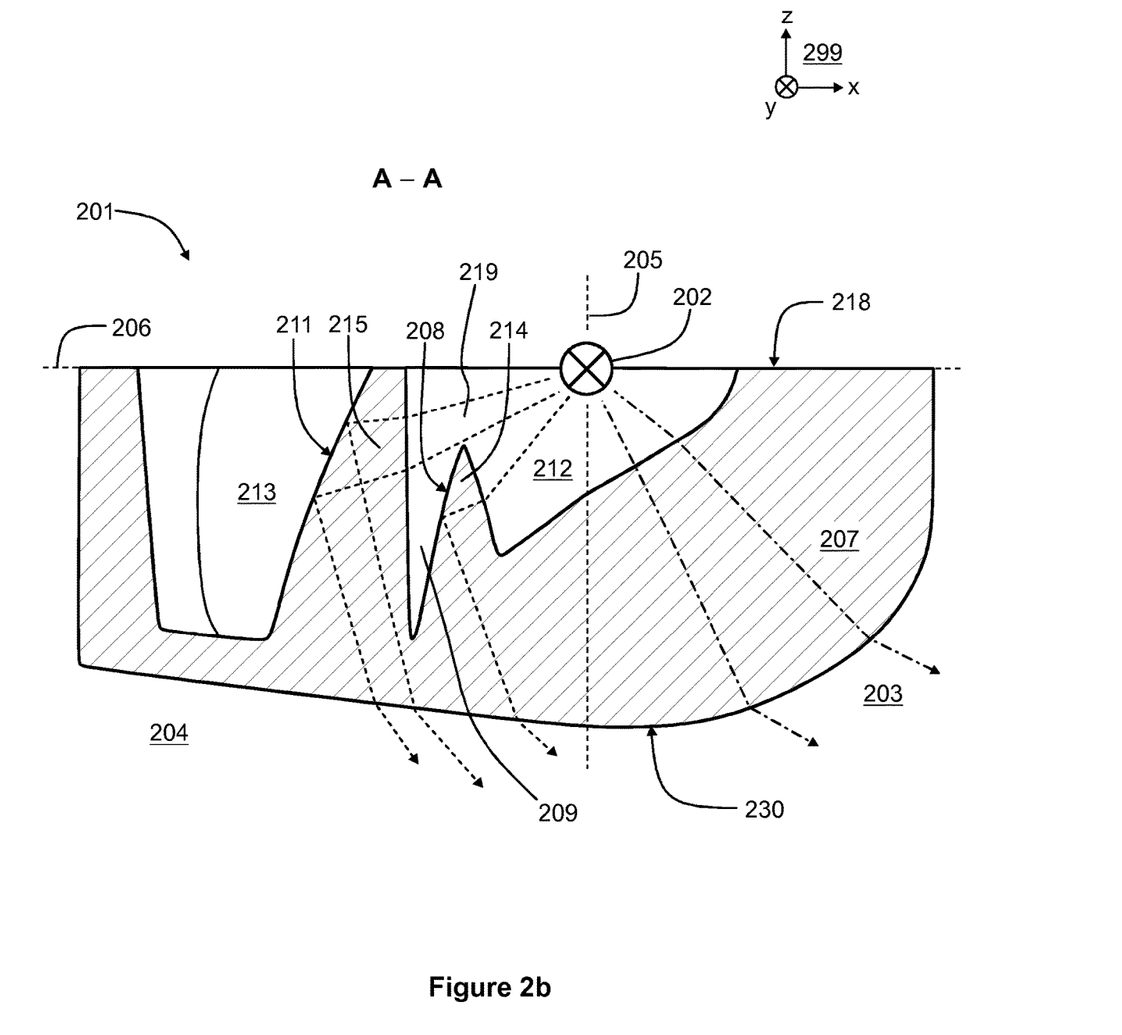

FIGS. 2a and 2b illustrate an optical device 201 according to an exemplifying and non-limiting embodiment of the invention for modifying a light distribution pattern of a light source 202 that can be, for example but not necessarily, a light emitting diode "LED", a filament lamp, or a gas-discharge lamp. FIG. 2b shows a view of a section taken along the line A-A shown in FIG. 2a. The section plane is parallel with the xz-plane of a coordinate system 299. As illustrated in FIGS. 2a and 2b, the light source 202 is arranged to radiate first light beams to a first geometric quarter-space 203 and second light beams to a second geometric quarter-space 204, where the first and second geometric quarter-spaces are defined by mutually perpendicular first and second geometric planes 205 and 206 so that the first geometric plane 205 constitutes a boundary between the first and second geometric quarter-spaces 203 and 204. In FIGS. 2a and 2b, some of the above-mentioned first light beams are depicted with dot-and-dash line arrows and some of the above-mentioned second light beams are depicted with dashed line arrows. It is to be noted that the above-mentioned first and second geometric planes 205 and 206 are mere geometrical concepts for illustrative purposes only but not physical elements of the optical device 201 or of the light source 202. The first geometric plane 205 is parallel with the yz-plane of a coordinate system 299 and the second geometric plane 206 is parallel with the xy-plane of the coordinate system 299.

The optical device 201 comprises a lens-section 207 for modifying the light distribution pattern of the above-mentioned first light beams. The optical device 201 comprises a first reflector surface 208 for reflecting a first part of the above-mentioned second light beams from the second geometric quarter-space 204 to the first geometric quarter-space 203 so that total internal reflection "TIR" takes place when the first part of the second light beams arrive, from inside transparent material, at the first reflector surface 208. The optical device 201 comprises a second reflector surface 211 for reflecting a second part of the second light beams from the second geometric quarter-space 204 to the first geometric quarter-space 203 so that total internal reflection takes place when the second part of the second light beams arrive, from inside the transparent material, at the second reflector surface 211. In addition to the light which is reflected by the reflector surface 208 or 211, the light source 202 may radiate, to the second geometric quarter-space 204, light that does not fall on either one of the reflector surfaces 208 and 211. The aim is, however, to minimize the amount of light which is radiated to the second geometric quarter-space 204 but which is not reflected.

As illustrated in FIGS. 2a and 2b, the first and second reflector surfaces 208 and 211 are successively in a direction perpendicular to the first geometric plane 205 so that the first reflector surface 208 is between the first geometric plane 205 and the second reflector surface 211. As illustrated in FIG. 2b, the first reflector surface 208 is farther from the second geometric plane 206 than is the second reflector surface 211 so that an area 219 between the first reflector surface 208 and the second geometric plane 206 constitutes a propagation passage for the second part of the second light beams on a route to the second reflector surface 211. As can be understood with the aid of FIG. 2b, the first reflector surface 208, which is nearer to the light source 202, reflects light for which the second reflector surface 211 would be too low in the negative z-direction of the coordinate system 299. Therefore, the optical device 201 does not need to be as high in the z-direction of the coordinate system 299 as a corresponding optical device that comprises only one reflector surface such as e.g. the optical device 101 illustrated in FIGS. 1e and 1f.

As illustrated in FIG. 2a, the first reflector surface 208 is convex towards the first geometric quarter-space 203 so as to spread the reflected first part of second light beams to sideward directions, and the second reflector surface 211 is wedge-shaped and pointing towards the first geometric quarter-space 203 so as to spread the reflected second part of second light beams to the sideward directions. It is also possible to provide the first reflector surface 208 and/or the second reflector surface 211 with grooves and/or other undulations so as to spread the reflected light in a desired way.

The exemplifying optical device 201 illustrated in FIGS. 2a and 2b is a single piece of transparent material. The piece of transparent material comprises a first cavity 212 for the light source 202 as illustrated in FIGS. 2a and 2b. The piece of transparent material comprises a second cavity 209 whose surface constitutes the first reflector surface 208 so that total internal reflection "TIR" takes place, as illustrated in FIG. 2b, when light beams arrive at the first reflector surface 208 from inside the transparent material. The piece of transparent material comprises a third cavity 213 whose surface constitutes the second reflector surface 211 so that total internal reflection takes place, as illustrated in FIG. 2b, when light beams arrive at the second reflector surface 211 from inside the transparent material. As illustrated in FIG. 2b, a wall 214 between the first and second cavities 212 and 209 is farther from the second geometric plane 206 than is a wall 215 between the second and third cavities 209 and 213. A part of the wall 215 constitutes a part of the route of the second part of the second light beams to the second reflector surface 211. A light-ingress surface of the above-mentioned part of the wall 215 can be provided with grooves and/or other undulations for spreading a light distribution pattern of the second part of the second light beams in the sideward directions. In FIG. 2a, one of the grooves is denoted with a reference 216. The grooves are substantially perpendicular to a geometric section line between the first and second geometric planes 205 and 206.

The above-mentioned first, second, and third cavities 212, 209, and 213 are formed so that a first surface 218 of the piece of transparent material comprises pits constituting the first, second, and third cavities 212, 209, and 213, and the first surface 218 is substantially planar on regions surrounding the pits. A second surface 230 of the piece of transparent material is shaped so that a desired light distribution is achieved. The first surface 218 can be installed for example to be against a circuit board where the light source 202 is mounted on a surface of the circuit board. In the exemplifying case illustrated in FIGS. 2a and 2b, the piece of transparent material constituting the optical device 201 is substantially symmetric with respect to a third geometric plane which is parallel with the xz-plane of the coordinate system 299 and which coincides with the section plane related to the section view shown in FIG. 2b. In FIG. 2a, the third geometric plane is denoted with a reference 217. Asymmetric shapes are, however, also possible. The piece of transparent material can be made of for example acrylic plastic, polycarbonate, optical silicone, or glass. The method of manufacture can be for example mold casting.

Figure 3:
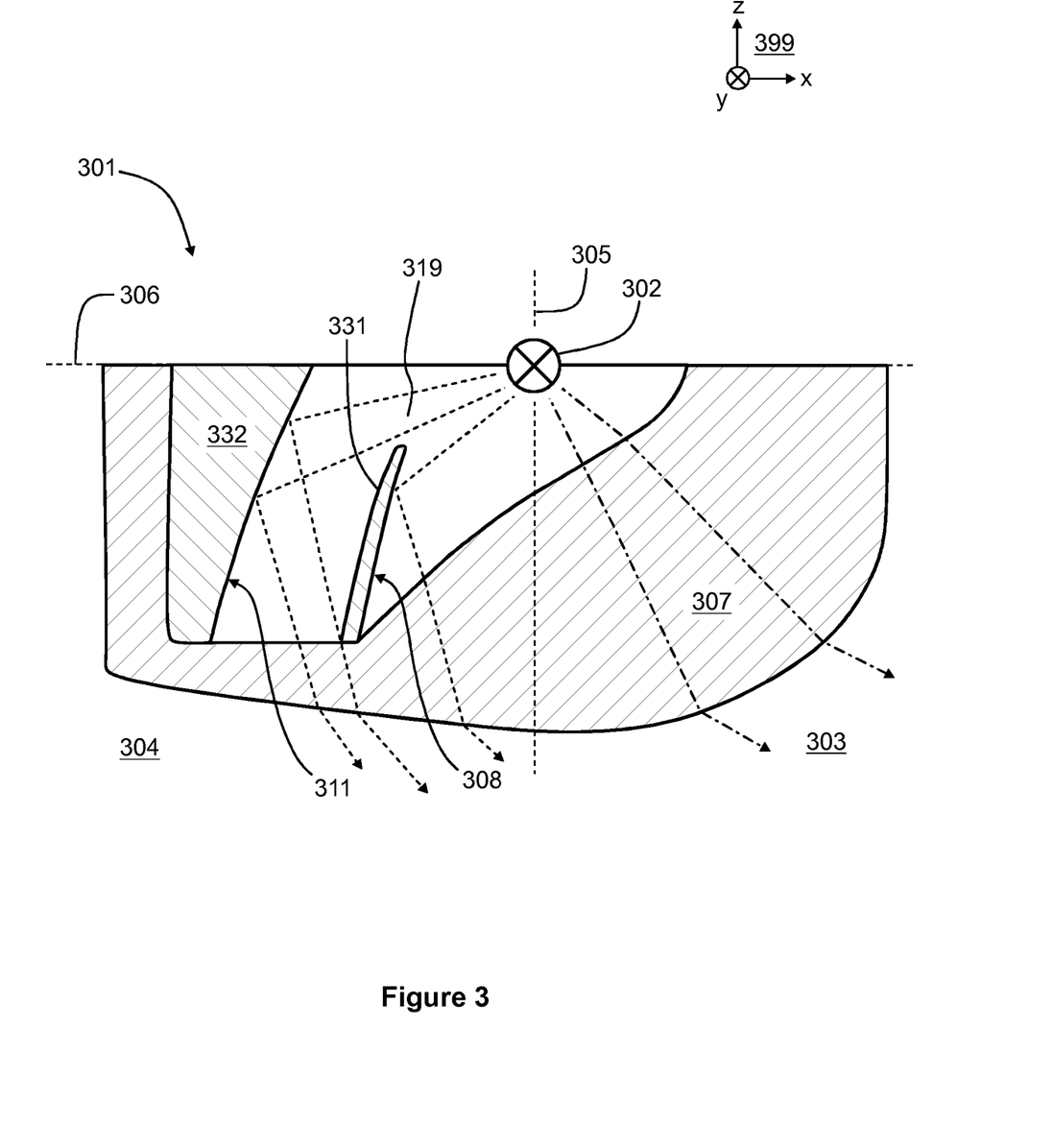
FIG. 3 illustrates an optical device having an alternative mechanical structure and operating in a same way as an optical device according to an exemplifying and non-limiting embodiment of the invention.

FIG. 3 shows a section-view of an optical device 301 for modifying the light distribution pattern of a light source 302. The section plane is parallel with the xz-plane of a coordinate system 399. The light source 302 is arranged to radiate first light beams to a first geometric quarter-space 303 and second light beams to a second geometric quarter-space 304, where the first and second quarter-spaces are defined by mutually perpendicular first and second geometric planes 305 and 306 so that the first geometric plane 305 constitutes a boundary between the first and second geometric quarter-spaces. The first geometric plane 305 is parallel with the yz-plane of a coordinate system 399 and the second geometric plane 306 is parallel with the xy-plane of the coordinate system 399. In FIG. 3, some of the first light beams are depicted with dot-and-dash line arrows and some of the second light beams are depicted with dashed line arrows. The optical device 301 comprises a lens-section 307 for modifying the light distribution pattern of the above-mentioned first light beams. The optical device 301 comprises a first reflector surface 308 for reflecting a first part of the above-mentioned second light beams from the second geometric quarter-space 304 to the first geometric quarter-space 303. The optical device 301 comprises a second reflector surface 311 for reflecting a second part of the second light beams from the second geometric quarter-space 304 to the first geometric quarter-space 303. The first and second reflector surfaces 308 and 311 are successively in a direction perpendicular to the first geometric plane 305 so that the first reflector surface 308 is between the first geometric plane 305 and the second reflector surface 311. The first reflector surface 308 is farther from the second geometric plane 306 than is the second reflector surface 311 so that an area 319 between the first reflector surface 308 and the second geometric plane 306 constitutes a propagation passage for the second part of the second light beams on a route to the second reflector surface 311.

In the exemplifying optical device illustrated in FIG. 3, the first reflector surface 308 is an outer surface of an element 331 that can be, for example, a piece of metal such as aluminum or a piece of plastics coated with a reflective layer. Correspondingly, the second reflector surface 311 is an outer surface of an element 332 that can be, for example, a piece of metal such as aluminum or a piece of plastics coated with a reflective layer. Therefore, the principle based on two reflector surfaces and described above with reference to FIGS. 2a and 2b is applicable also in optical devices where reflector surfaces are implemented with non-transparent reflective material, e.g. metal.

Figure 4A:
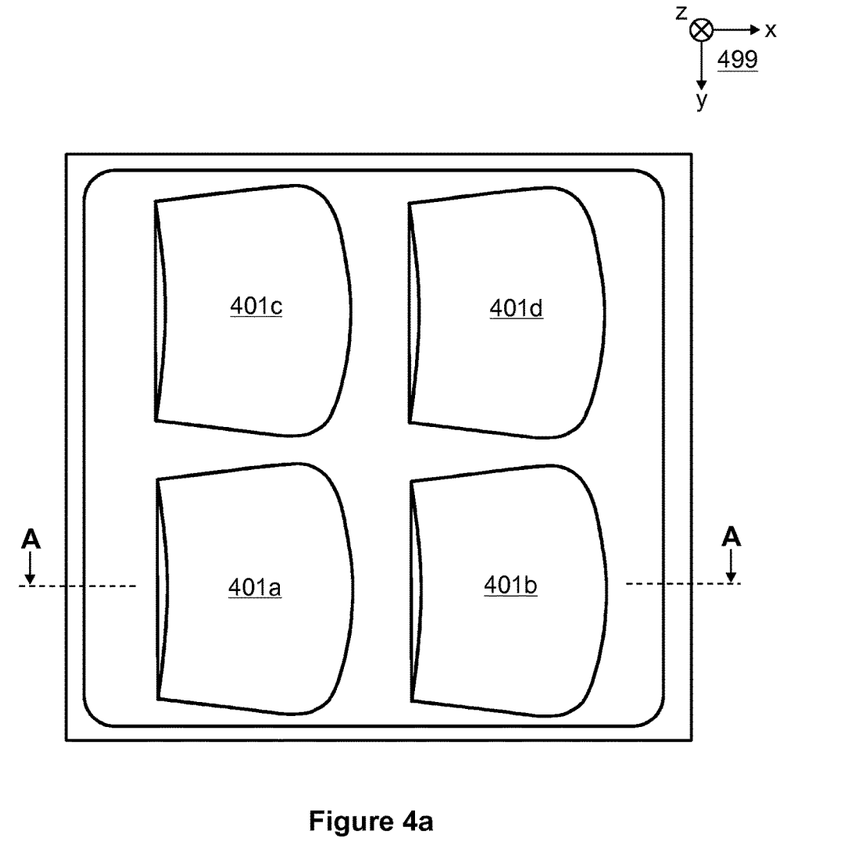
FIGS. 4a and 4b illustrate a lighting fixture according to an exemplifying and non-limiting embodiment of the invention.
Figure 4B:
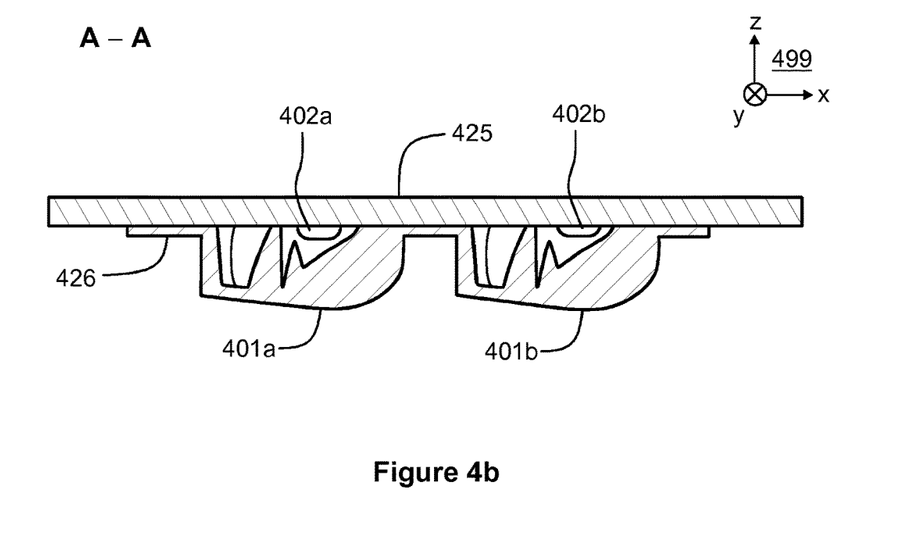

FIGS. 4a and 4b illustrate a lighting fixture according to an exemplifying and non-limiting embodiment of the invention. FIG. 4b shows a view of a section taken along the line A-A shown in FIG. 4a. The section plane is parallel with the xz-plane of a coordinate system 499. The lighting fixture comprises four light sources and four optical devices 401a, 401b, 401c and 401d. Each of the optical devices is according to an exemplifying and non-limiting embodiment of the invention. In FIG. 4a, two of the light sources are depicted with references 402a and 402b. Each of the optical devices 401a-401d can be for example such as illustrated in FIGS. 2a and 2b. Each of the light sources may comprise at least one light emitting diode "LED". In the exemplifying case illustrated in FIGS. 4a and 4b, the lighting fixture further comprises a circuit board 425. In this exemplifying case, the optical devices 401a-401d are parts of a single piece 426 of transparent material. The light sources are located on a surface of the circuit board 425 and in cavities of the optical devices 401a-401d as illustrated in FIG. 4b.

Figure 5A:
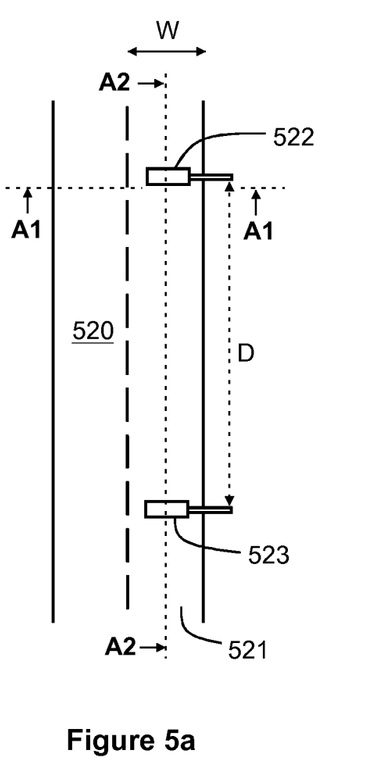
FIGS. 5a-5c illustrate a street lighting application according to an exemplifying and non-limiting embodiment of the invention, and FIG. 6a describes the operation of an optical device according to an exemplifying and non-limiting embodiment of the invention, and FIG. 6b describes the operation of an optical device according to the prior art such as shown in FIGS. 1e and 1f.
Figure 5B:
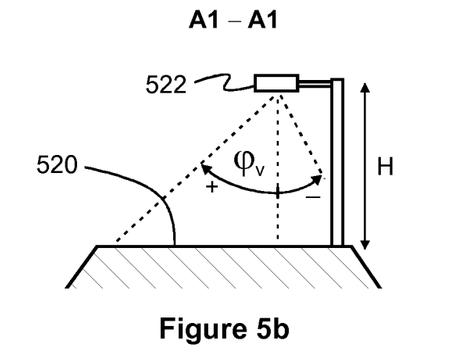
Figure 5C:
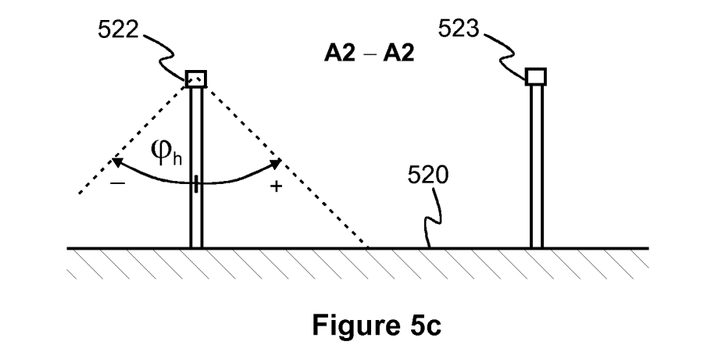

FIG. 5a shows a schematic illustration of a street lighting application where streetlamps 522 and 523 are arranged to illuminate a road 520. FIG. 5b shows a view of a section taken along the line A1-A1 shown in FIG. 5a, and FIG. 5c shows a view of a section taken along the line A2-A2 shown in FIG. 5a. Each of the streetlamps 522 and 523 comprises one or more lighting fixtures each of which comprises one or more light sources, e.g. light emitting diodes "LED", and one or more optical devices for modifying the light distribution pattern of the one or more light sources. Each optical device can be according to what is illustrated in FIGS. 2a and 2b or in FIG. 3. Each optical device is positioned with respect to the road 520 so that a geometric section line between the first and second geometric planes related to the optical device under consideration is substantially parallel with a longitudinal direction of the road 520. The above-mentioned first and second geometric planes are defined above with reference to FIG. 2b and to FIG. 3.

Figure 6A:
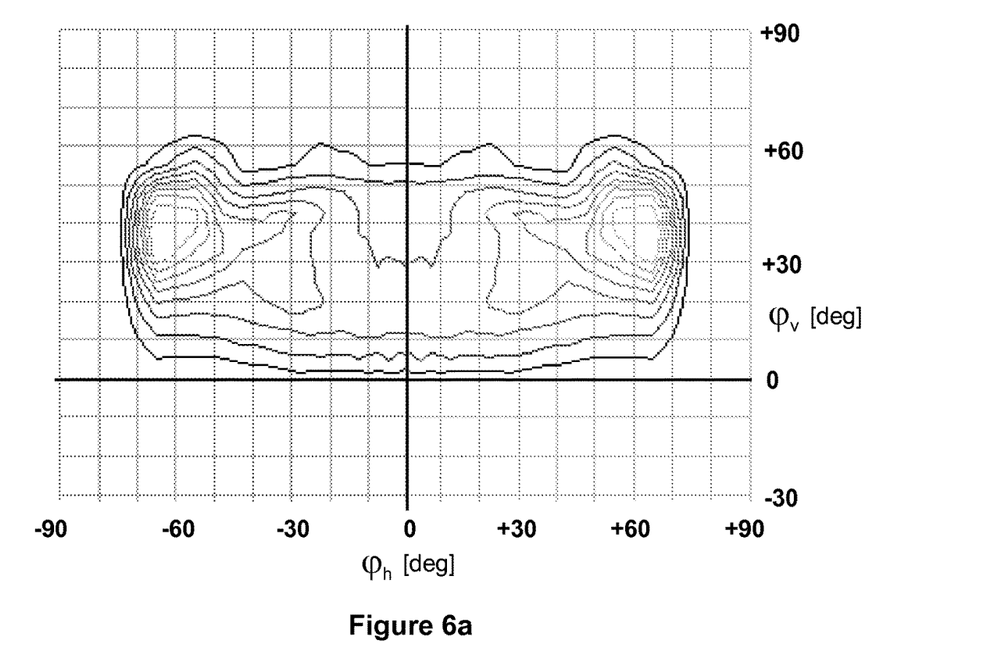
Figure 6B:
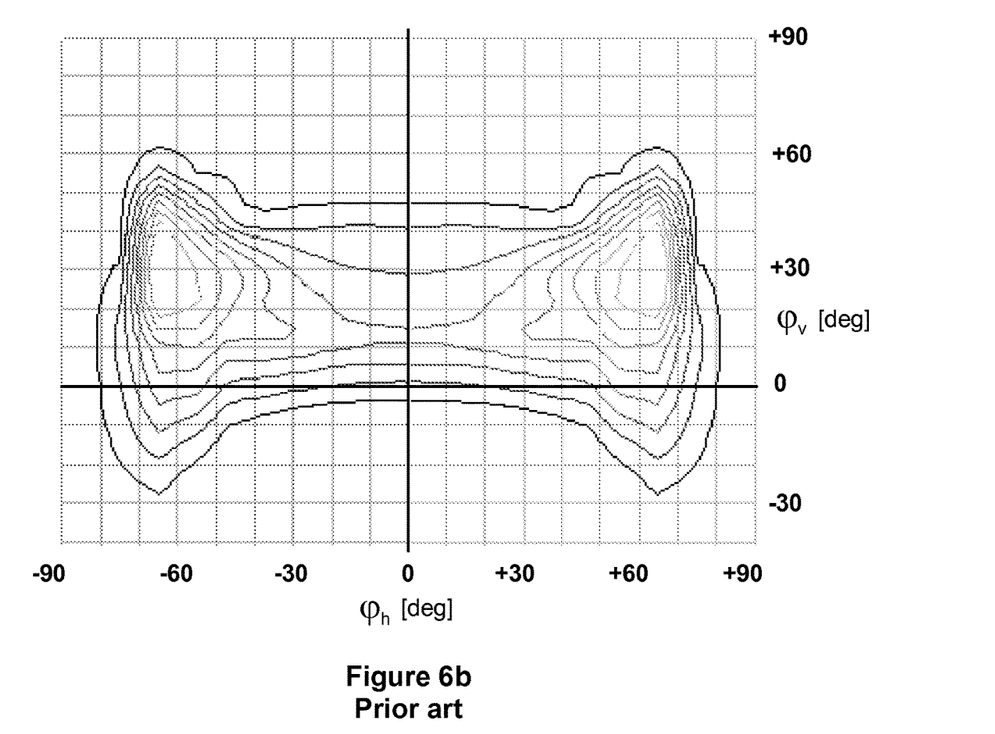

FIG. 6a describes the operation of an optical device illustrated in FIGS. 2a and 2b, and FIG. 6b describes the operation of an optical device according to the prior art such as illustrated in FIGS. 1e and 1f. FIGS. 6a and 6b show isocandela curves on an inner surface of a sphere having an optical device and a light source substantially at its center point. On each isocandela curve, the luminous power per unit solid angle is constant. The angle $\varphi_v$ is defined in FIG. 5b, and the angle $\varphi_h$ is defined in FIG. 5c. As can be seen in FIGS. 6a and 6b, the optical device illustrated in FIGS. 2a and 2b does not direct so much light backwards, i.e. to directions where the angle $\varphi_v$ is negative, as does the optical device illustrated in FIGS. 1e and 1f.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device comprising:
 a lens-section for acting as a lens for modifying a light distribution pattern of the first light beams,
 a first reflector surface for reflecting a first part of the second light beams from the second geometric quarter-space to the first geometric quarter-space, and
 a second reflector surface for reflecting a second part of the second light beams from the second geometric quarter-space to the first geometric quarter-space,
wherein the first and second reflector surfaces are successively in a direction perpendicular to the first geometric plane so that the first reflector surface is between the first geometric plane and the second reflector surface, and wherein the first reflector surface is farther from the second geometric plane than is the second reflector surface so that an area between the first reflector surface and the second geometric plane constitutes a propagation passage for the second part of the second light beams on a route to the second reflector surface, and wherein the optical device is a transparent piece comprising:
 a first cavity for the light source,
 a second cavity whose surface constitutes the first reflector surface so that total internal reflection takes place when the first part of the second light beams arrive, from inside the transparent piece, at the surface of the second cavity, and
 a third cavity whose surface constitutes the second reflector surface so that total internal reflection takes place when the second part of the second light beams arrive, from inside the transparent piece, at the surface of the third cavity, a wall between the first and second cavities being farther from the second geometric plane than is a wall between the second and third cavities, and a part of the wall between the second and third cavities constitutes a part of the route of the second part of the second light beams to the second reflector surface.

2. An optical device according to claim 1, wherein the second reflector surface is wedge-shaped and pointing towards the first geometric quarter-space so as to direct the reflected second part of second light beams to sideward directions.

3. An optical device according to claim 1, wherein a surface of the part of the wall between the second and third cavities comprises grooves for spreading a light distribution pattern of the second part of the second light beams in sideward directions, the grooves being substantially perpendicular to a geometric section line between the first and second geometric planes.

4. An optical device according to claim 1, wherein the transparent piece is substantially symmetric with respect to a third geometric plane perpendicular to the first and second geometric planes.

5. An optical device according to claim 1, wherein a first surface of the transparent piece comprises pits constituting the first, second, and third cavities and the first surface of the transparent piece is substantially planar on regions surrounding the pits.

6. An optical device according to claim 1, wherein the transparent piece is made of one of the following: acrylic plastic, polycarbonate, optical silicone, glass.

7. A lighting fixture comprising a light source and an optical device for modifying a light distribution pattern of the light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device comprising:
 a lens-section for acting as a lens for modifying a light distribution pattern of the first light beams,
 a first reflector surface for reflecting a first part of the second light beams from the second geometric quarter-space to the first geometric quarter-space, and
 a second reflector surface for reflecting a second part of the second light beams from the second geometric quarter-space to the first geometric quarter-space,
wherein the first and second reflector surfaces are successively in a direction perpendicular to the first geometric plane so that the first reflector surface is between the first geometric plane and the second reflector surface, and wherein the first reflector surface is farther from the second geometric plane than is the second reflector surface so that an area between the first reflector surface and the second geometric plane constitutes a propagation passage for the second part of the second light beams on a route to the second reflector surface, and wherein the optical device is a transparent piece comprising:
 a first cavity for the light source,
 a second cavity whose surface constitutes the first reflector surface so that total internal reflection takes place when the first part of the second light beams arrive, from inside the transparent piece, at the surface of the second cavity, and
 a third cavity whose surface constitutes the second reflector surface so that total internal reflection takes place when the second part of the second light beams arrive, from inside the transparent piece, at the surface of the third cavity, a wall between the first and second cavities being farther from the second geometric plane than is a wall between the second and third cavities, and a part of the wall between the second and third cavities constitutes a part of the route of the second part of the second light beams to the second reflector surface.

8. A lighting fixture according to claim 7, wherein the lighting fixture further comprises a circuit board and a first surface of the transparent piece of the optical device comprises pits constituting the first, second, and third cavities and the first surface of the transparent piece is substantially planar on regions surrounding the pits, the planar regions of the first surface of the transparent piece being against the circuit board and the light source being in the first cavity.

9. A lighting fixture according to claim 7, wherein the lighting fixture comprises a plurality of optical devices in each of which a first surface of the transparent piece of the optical device comprises pits constituting the first, second, and third cavities and the first surface of the transparent piece is substantially planar on regions surrounding the pits, and a plurality of light sources, the optical devices being parts of a single piece of transparent material.

10. A mold having a form suitable for manufacturing, by mold casting, the transparent piece constituting an optical device for modifying a light distribution pattern of a light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device comprising:
 a lens-section for acting as a lens for modifying a light distribution pattern of the first light beams,
 a first reflector surface for reflecting a first part of the second light beams from the second geometric quarter-space to the first geometric quarter-space, and
 a second reflector surface for reflecting a second part of the second light beams from the second geometric quarter-space to the first geometric quarter-space,
wherein the first and second reflector surfaces are successively in a direction perpendicular to the first geometric plane so that the first reflector surface is between the first geometric plane and the second reflector surface, and wherein the first reflector surface is farther from the second geometric plane than is the second reflector surface so that an area between the first reflector surface and the second geometric plane constitutes a propagation passage for the second part of the second light beams on a route to the second reflector surface, and wherein the optical device is a transparent piece comprising:
 a first cavity for the light source,
 a second cavity whose surface constitutes the first reflector surface so that total internal reflection takes place when the first part of the second light beams arrive, from inside the transparent piece, at the surface of the second cavity, and
 a third cavity whose surface constitutes the second reflector surface so that total internal reflection takes place when the second part of the second light beams arrive, from inside the transparent piece, at the surface of the third cavity, a wall between the first and second cavities being farther from the second geometric plane than is a wall between the second and third cavities, and a part of the wall between the second and third cavities constitutes a part of the route of the second part of the second light beams to the second reflector surface.

11. A system comprising a road and a streetlamp comprising at least one lighting fixture comprising a light source and an optical device for modifying a light distribution pattern of the light source radiating first light beams to a first geometric quarter-space and second light beams to a second geometric quarter-space, the first and second geometric quarter-spaces being defined by mutually perpendicular first and second geometric planes so that the first geometric plane constitutes a boundary between the first and second geometric quarter-spaces, the optical device comprising:
 a lens-section for acting as a lens for modifying a light distribution pattern of the first light beams,
 a first reflector surface for reflecting a first part of the second light beams from the second geometric quarter-space to the first geometric quarter-space, and
 a second reflector surface for reflecting a second part of the second light beams from the second geometric quarter-space to the first geometric quarter-space,
wherein the first and second reflector surfaces are successively in a direction perpendicular to the first geometric plane so that the first reflector surface is between the first geometric plane and the second reflector surface, and wherein the first reflector surface is farther from the second geometric plane than is the second reflector surface so that an area between the first reflector surface and the second geometric plane constitutes a propagation passage for the second part of the second light beams on a route to the second reflector surface, and wherein the optical device is a transparent piece comprising:

a first cavity for the light source, a second cavity whose surface constitutes the first reflector surface so that total internal reflection takes place when the first part of the second light beams arrive, from inside the transparent piece, at the surface of the second cavity, and a third cavity whose surface constitutes the second reflector surface so that total internal reflection takes place when the second part of the second light beams arrive, from inside the transparent piece, at the surface of the third cavity, a wall between the first and second cavities being farther from the second geometric plane than is a wall between the second and third cavities, and a part of the wall between the second and third cavities constitutes a part of the route of the second part of the second light beams to the second reflector surface, wherein each optical device of the least one lighting fixture is positioned with respect to the road so that a geometric section line between the first and second geometric planes related to the optical device under consideration is substantially parallel with a longitudinal direction of the road.

12. An optical device according to claim 3, wherein the transparent piece is substantially symmetric with respect to a third geometric plane perpendicular to the first and second geometric planes.

13. An optical device according to claim 2, wherein a first surface of the transparent piece comprises pits constituting the first, second, and third cavities and the first surface of the transparent piece is substantially planar on regions surrounding the pits.

14. An optical device according to claim 3, wherein a first surface of the transparent piece comprises pits constituting the first, second, and third cavities and the first surface of the transparent piece is substantially planar on regions surrounding the pits.

15. An optical device according to claim 4, wherein a first surface of the transparent piece comprises pits constituting the first, second, and third cavities and the first surface of the transparent piece is substantially planar on regions surrounding the pits.

16. An optical device according to claim 12, wherein a first surface of the transparent piece comprises pits constituting the first, second, and third cavities and the first surface of the transparent piece is substantially planar on regions surrounding the pits.

17. An optical device according to claim 2, wherein the transparent piece is made of one of the following: acrylic plastic, polycarbonate, optical silicone, glass.

18. An optical device according to claim 3, wherein the transparent piece is made of one of the following: acrylic plastic, polycarbonate, optical silicone, glass.

19. An optical device according to claim 4, wherein the transparent piece is made of one of the following: acrylic plastic, polycarbonate, optical silicone, glass.

20. An optical device according to claim 5, wherein the transparent piece is made of one of the following: acrylic plastic, polycarbonate, optical silicone, glass.

* * * * *